(12) United States Patent
Shimasaki et al.

(10) Patent No.: US 7,639,190 B2
(45) Date of Patent: Dec. 29, 2009

(54) LAPTOP PERSONAL COMPUTER WITH A RADIO COMMUNICATION ANTENNA

(75) Inventors: Hiroshi Shimasaki, Hamura (JP); Masao Teshima, Kunitachi (JP); Satoshi Mizoguchi, Ome (JP); Anwar Sathath, Ome (JP); Toshiyuki Hirota, Hino (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 11/802,148

(22) Filed: May 21, 2007

(65) Prior Publication Data

US 2007/0273594 A1   Nov. 29, 2007

(30) Foreign Application Priority Data

May 29, 2006   (JP) .............................. 2006-148798

(51) Int. Cl.
*H01Q 1/24* (2006.01)
(52) U.S. Cl. .................. 343/702; 455/575.5; 455/575.7
(58) Field of Classification Search ................. 343/702; 455/575.5, 575.7
See application file for complete search history.

(56) References Cited

U.S. PATENT DOCUMENTS

| | | | |
|---|---|---|---|
| 6,972,722 B2 | 12/2005 | Katoh et al. | |
| 7,221,320 B2* | 5/2007 | Sathath | 343/700 MS |
| 7,242,354 B2* | 7/2007 | Katoh et al. | 343/702 |
| 2006/0139220 A1* | 6/2006 | Hirota et al. | 343/702 |

FOREIGN PATENT DOCUMENTS

| | | |
|---|---|---|
| CN | 1400513 | 3/2003 |
| JP | 10-163733 (A) | 6/1998 |
| JP | 2002-073210 | 3/2002 |
| JP | 2002-261665 (A) | 9/2002 |
| JP | 2003-037538 | 2/2003 |
| JP | 2004-32462 (A) | 1/2004 |
| JP | 2004-246606 | 9/2004 |
| JP | 205-268851 | 9/2005 |
| JP | 2006-019981 (A) | 1/2006 |
| JP | 2007-074446 | 3/2007 |

OTHER PUBLICATIONS

Japanese Office Action dated Apr. 25, 2008 for Application No. 2006-148798.
Japanese Office Action dated Jul. 29, 2008 for Appln. No. 2006-148798.
Chinese Office Action dated Aug. 22, 2008 for Appln. No. 2007101098011.

* cited by examiner

*Primary Examiner*—Tho G Phan
(74) *Attorney, Agent, or Firm*—Pillsbury Winthrop Shaw Pittman, LLP

(57) ABSTRACT

According to an embodiment, a laptop personal computer comprises a display housing with a display unit, a main body housing which houses a radio communication module, a connecting unit which rotatably connects between the display housing and the main body housing, a first radio communication antenna as a main antenna which is formed at an end part of the display housing almost orthogonal to the connecting unit, a second radio communication antenna as a sub antenna which is formed at an end part of the display housing in almost parallel with the connecting unit, the second radio communication antenna making a pair with the first radio communication antenna, a first cable which connects the first radio communication antenna to the radio communication module through the connecting unit, and a second cable which connects the second radio communication antenna to the radio communication module through the connecting unit.

5 Claims, 6 Drawing Sheets

| TX Mode | Low channel Frequency | | Mid channel Frequency | | High channel Frequency | |
|---|---|---|---|---|---|---|
| GSM 850 | 824.2 | MHz | 836.6 | MHz | 848.8 | MHz |
| EGSM 900 | 880.2 | MHz | 897.6 | MHz | 914.8 | MHz |
| GSM 900 | 890.2 | MHz | 902.4 | MHz | 914.8 | MHz |
| DCS/GSM 1800 | 1710.2 | MHz | 1748 | MHz | 1784.8 | MHz |
| PCS GSM 1900 | 1850.2 | MHz | 1880 | MHz | 1909.8 | MHz |
| 3G UMTS(Band I) | 1922.4 | MHz | 1950 | MHz | 1977.6 | MHz |

| RX Mode | Low channel Frequency | | Mid channel Frequency | | High channel Frequency | |
|---|---|---|---|---|---|---|
| GSM 850 | 869.2 | MHz | 881.6 | MHz | 893.8 | MHz |
| EGSM 900 | 925.2 | MHz | 942.6 | MHz | 959.8 | MHz |
| GSM 900 | 935.2 | MHz | 947.4 | MHz | 959.8 | MHz |
| DCS/GSM 1800 | 1805.2 | MHz | 1843 | MHz | 1879.8 | MHz |
| PCS GSM 1900 | 1930.2 | MHz | 1960 | MHz | 1989.8 | MHz |
| 3G UMTS(Band I) | 2112.4 | MHz | 2140 | MHz | 2167.6 | MHz |

FIG. 7

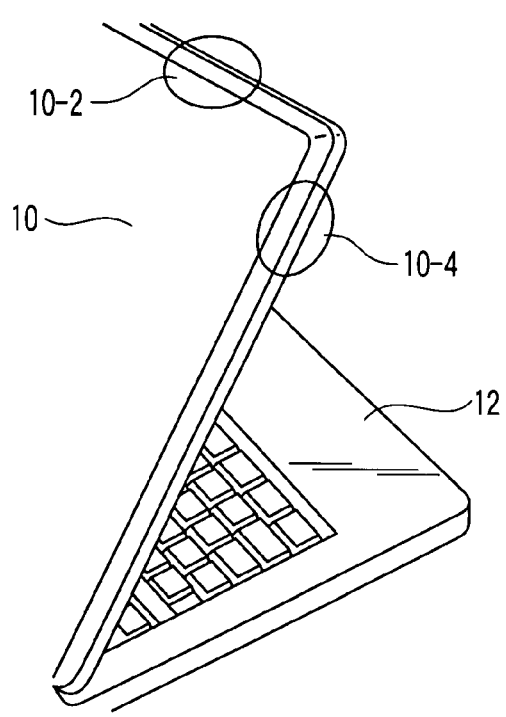

FIG. 8

State in which a tablet PC is folded

LAPTOP PERSONAL COMPUTER WITH A RADIO COMMUNICATION ANTENNA

CROSS-REFERENCE TO RELATED APPLICATIONS

This application is based upon and claims the benefit of priority from the Japanese Patent Application No. 2006-148798, filed May 29, 2006, the entire contents of which are incorporated herein by reference.

BACKGROUND

1. Field

One embodiment of the present invention relates to a laptop personal computer (hereinafter, simply referred to as PC) with a pair of radio communication antennas.

2. Description of the Related Art

A laptop PC with a radio communication antenna has been developed up to now. For example, Jpn. Pat. Appln. KOKAI Publication No. 2002-73210 discloses a configuration in which a plurality of radio communication antennas are mounted at upper end parts of a display unit (LCD) attached to a main body.

BRIEF DESCRIPTION OF THE SEVERAL VIEWS OF THE DRAWINGS

A general architecture that implements the various features of the invention will now be described with reference to the drawings. The drawings and the associated description are provided to illustrate embodiments of the invention and not to limit the scope of the invention.

FIG. 7 is an exemplary view illustrating frequency ranges of antennas to be used in a cellular system;

FIG. 8 is an exemplary view for explaining a configuration of the fourth embodiment of the invention;

DETAILED DESCRIPTION

Various embodiments according to the invention will be described hereinafter with reference to the accompanying drawings. In general, according to one embodiment of the invention, there is provided a laptop personal computer, comprising: a display housing with a display unit in an almost rectangular shape; a main body housing which houses a radio communication module; a connecting unit which rotatably connects between the display housing and the main body housing; a first radio communication antenna as a main antenna which is formed at an end part of the display housing to be almost orthogonal to the connecting unit; a second radio communication antenna as a sub antenna which is formed at an end part of the display housing to be in almost parallel with the connecting unit, the second radio communication antenna making a pair with the first radio communication antenna; a first cable which connects the first radio communication antenna to the radio communication module through the connecting unit; and a second cable which connects the second radio communication antenna to the radio communication module through the connecting unit.

Figure 1:
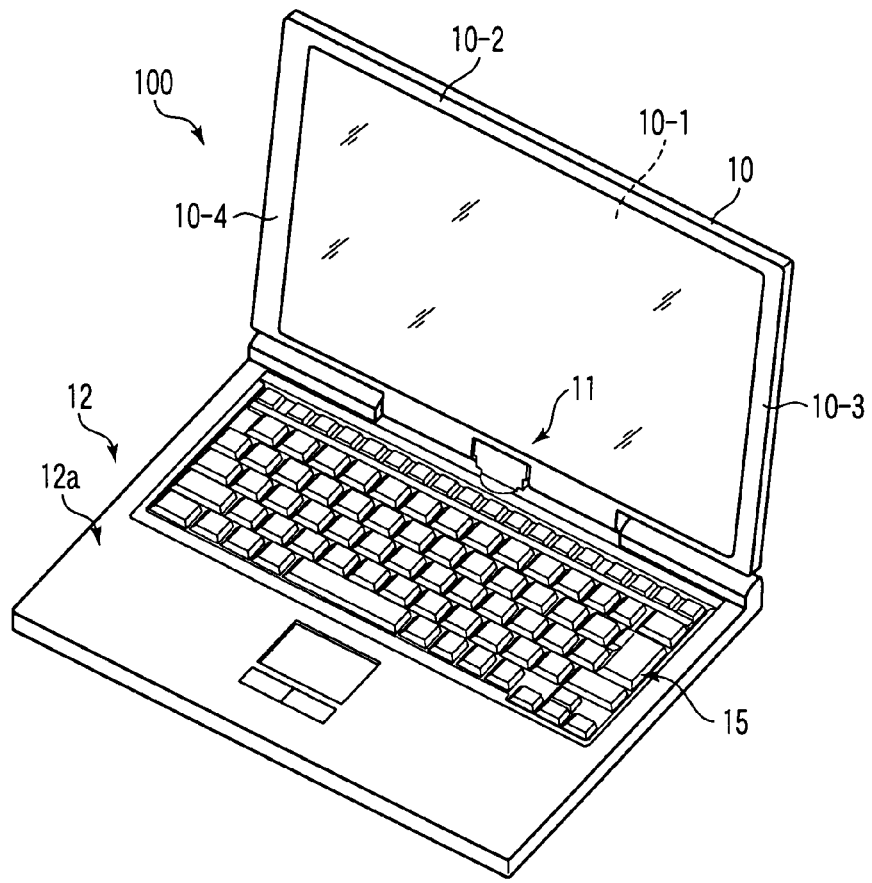
FIG. 1 is an exemplary appearance schematic view of a laptop PC to which an embodiment of the invention applied thereto.

Hereinafter, embodiments of the invention will be described in detail with reference to the drawings. FIG. 1 is an appearance schematic view of a laptop PC to which the embodiments applied thereto. A laptop PC 100 is composed of a display housing 10, and a main body housing 12 to be rotatably connected to the display housing 10 by a hinge unit 11 as a connecting unit. The display housing 10 includes an LCD 10-1 as a display unit in a nearly rectangular shape.

Here, among end parts of the display housing 10, an end part in almost parallel with a length direction of the hinge unit 11, and a right and a left end parts almost orthogonal to each other in the length direction of the hinge unit 11 are defined as an upper end part 10-2, a right end part 10-3, and a left end part 10-4, respectively. "Right" and "left" referred to here respectively correspond to the right and left directions when a user faces the LCD 10-1 of the display housing 10. "Upper" and "lower" referred to here respectively correspond to the upper and lower directions when a user faces the LCD 10-1 of the display housing 10. The end parts 10-2 to 10-4 of the display housing 10 are the parts surrounding the LCD 10-1 of the display housing 10 and their vicinities. Generally, if an antenna overlaps on the LCD 10-1, a property of the antenna decreasing, the property may be enhanced by disposing the antenna at the end part of the display housing 10 so that at least a part of the antenna does not overlap on the LCD 10-1.

The main body housing 12 has a circuit board with a CPU, etc., mounted thereon, a storage medium, a radio communication module connected to each antenna through cables (all of them are not shown). The main body housing 12 has them as built-in. The radio communication module disposed in the main body housing 12 is almost orthogonal to the right end part 10-3 and the left end part 10-4 of the display housing 10.

Figure 2:
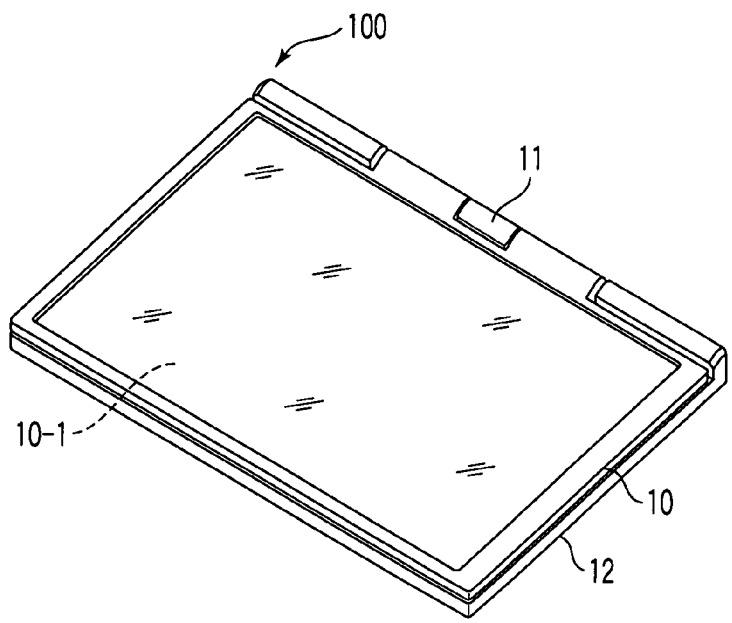
FIG. 2 is an exemplary view illustrating a folded state of the laptop PC shown in FIG. 1.

Further, a keyboard 15 that is an input means is disposed on an upper surface 12a. FIG. 2 depicts a state in which the laptop PC shown in FIG. 1 is folded.

Hereinafter, each embodiment of the invention will be set forth by using concrete examples.

First Embodiment

Figure 6:
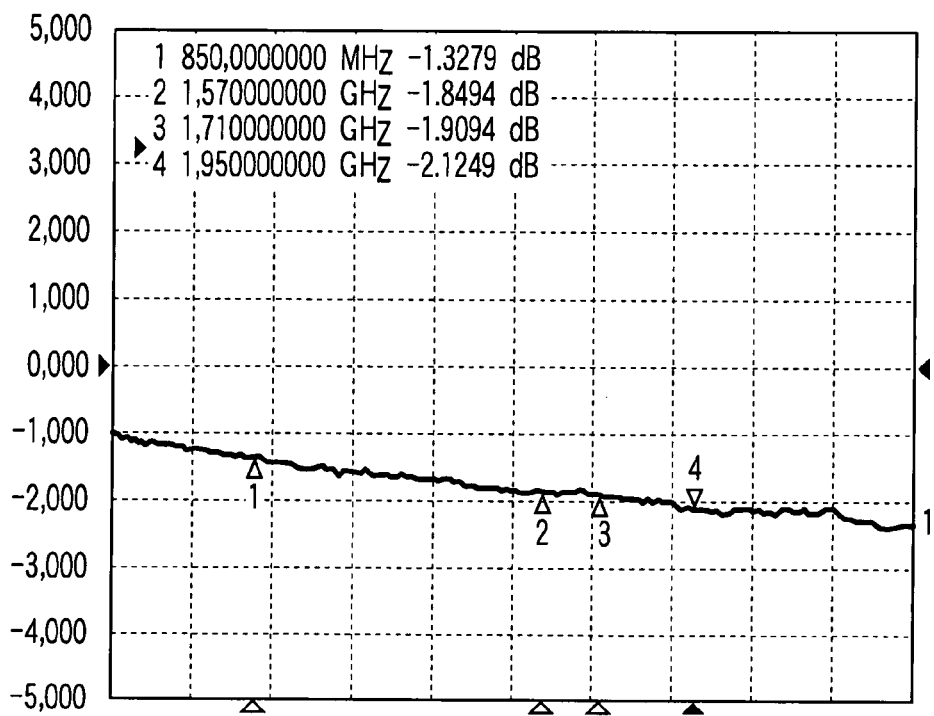
FIG. 6 is an exemplary view illustrating a relation between a transmission loss of a cable and a frequency.

FIG. 6 depicts a relation between a transmission loss of a cable and a frequency. As cleared from FIG. 6, the transmission efficiency of the cable decreases about 2 dB per 1 m when a frequency of 2 GHz is used. Therefore, the cable length is shorter, the cable loss becomes smaller.

Therefore, in the first embodiment, it is presumed that the cable length of a main antenna to a radio communication module is shorter than the length of a sub antenna. For example, the main antenna is a transmission/reception antenna, and the sub antenna is a reception antenna.

FIG. 6 shows the fact that the higher a frequency is, the larger a rate of decrease is. That is, when the frequency used gets higher, the cable loss becomes bigger. Therefore, if the embodiment is applied to a system using a higher frequency band, larger effect may be obtained.

Figure 3:
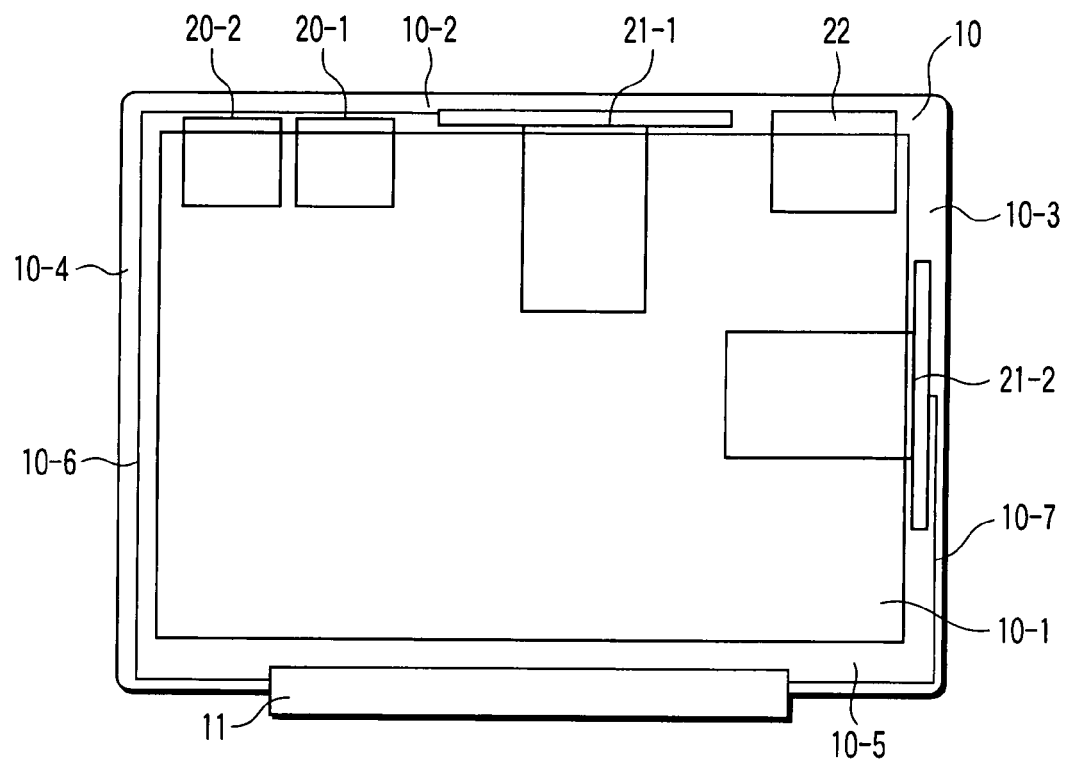
FIG. 3 is an exemplary view illustrating a configuration of a display housing of a laptop PC regarding the first embodiment of the invention.

FIG. 3 is a view showing a configuration of a display housing of a laptop PC regarding the first embodiment of the invention. The display housing 10 of the PC is connected to the main body housing (for example, 12 in FIG. 1) through the hinge unit 11. Wireless LAN (WLAN) antennas 20-1 and 20-2, a sub antenna 21-1, and ultra wide band (UWB) LAN antenna 22 are mounted in order from the left. A main antenna 21-2 is mounted at a right end part 10-3 of the display housing 10. The symbol 10-4 indicates the right end part of the display housing 10. The symbol 10-5 indicates the lower end part of the display housing 10.

The main antenna 21-2 is connected to the radio communication module by a power feeding cable 10-7 through the hinge unit 11, and the sub antenna 21-1 is connected to the radio communication module by a power feeding cable 10-6 through the hinge unit 11.

In FIG. 3, mounting two WLAN antennas 20-1 and 20-2 let them have diversity functions. For instance the sub antenna 21-1 and the main antenna 21-2 are used in a cellular system, and the forgoing one pair of antennas is disposed to give the diversity functions to the antennas. More specifically, disposing the cellular system antennas 21-1 and 21-2 by making an angle of 90-degree, and receiving different polarized waves enables enhancing a polarized wave diversity effect.

As shown in FIG. 3, by arranging the UWB antenna 22 between the cellular system antennas 21-1 and 21-2 while bringing them into a state not adjacent to each other, a distance between both antennas becomes large and a space diversity effect may be enhanced.

In the three radio systems (WLAN, UWB and cellular system), the frequency band of the WLAN is around 5.15-5.825 GHz, and the frequency band of the UWB is around 3.1-10.6 GHz. The frequency band of the cellular system is around in the vicinity of 800 MHz and 2 GHz, and in addition, the frequency in the bands can be used arbitrarily.

As discussed previously, in the first embodiment, the main antenna 21-2 is disposed at the right end part 10-3 of the display housing 10, and also the sub antenna 21-1 is disposed at the upper end part 10-2 of the display housing 10 among the one pair of antennas to be used in the same radio system. According to such an arrangement, the length of the power feeding cable 10-7 connecting the main antenna 21-2 to the radio communication module becomes shorter than that of the power feeding cable 10-6 connecting the sub-antenna 21-1 to the radio communication module. Thereby, the first embodiment may decrease the cable loss with respect to the main antenna 21-2 and may improve the communication performance.

The similar effect can be obtained even if the main antenna 21-2 is disposed at the left end part 10-4 instead of being disposed at the right end part 10-3.

Second Embodiment

Figure 4:
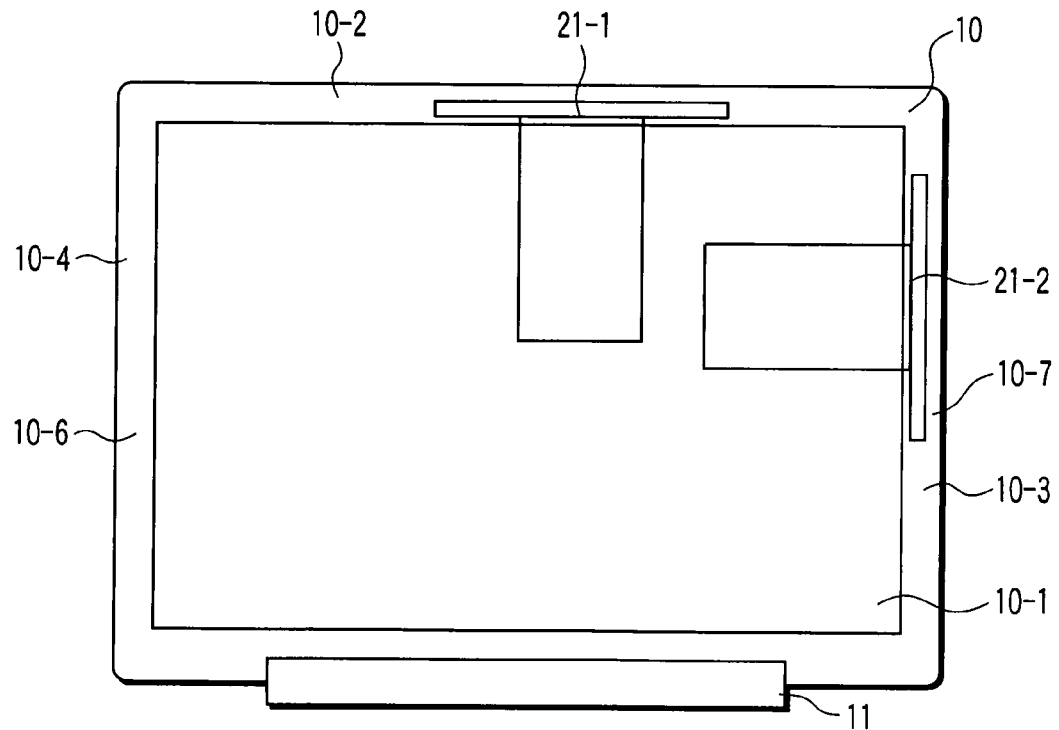
FIG. 4 is an exemplary view illustrating a configuration of a display housing of a laptop PC regarding the second embodiment of the invention.

FIG. 4 is a view depicting a configuration of a display housing of a laptop PC regarding the second embodiment. The sub antenna 21-1 is provided at the upper end part 10-2 of the display housing 10 with the LCD 10-1, and the main antenna 21-1 is provided at the right end part 10-3 of the display housing 10. The power feeding cable 10-7 connects the main antenna 21-2 and the radio communication module by means of the hinge unit 11, and the power feeding cable 10-6 connects the sub antenna 21-1 and the radio communication module by means of the hinge unit 11.

According to such an arrangement, the length of the power feeding cable 10-7 which connects the main antenna 21-2 and the radio communication module, becomes shorter than the length of the power feeding cable 10-6 connecting the sub antenna 21-1 and the radio communication module. Thereby, the laptop PC regarding the second embodiment may decrease the cable loss of relating to the main antenna 21-2 to improve the communication performance of the antennas.

Third Embodiment

Figure 5:
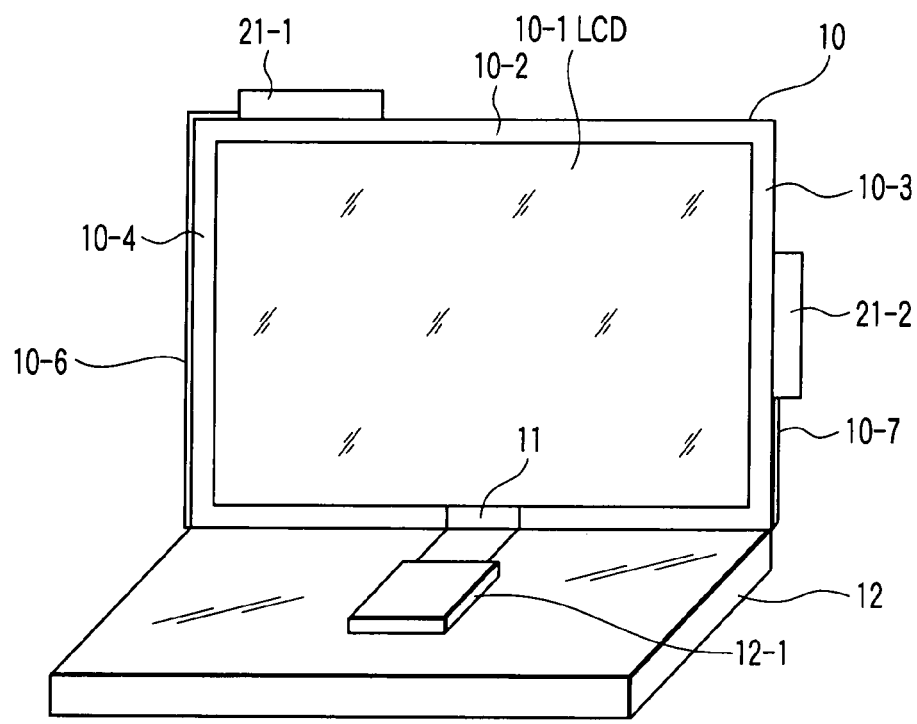
FIG. 5 is an exemplary view illustrating a configuration of a laptop PC regarding the third embodiment of the invention.

The third embodiment shows the case of application of this embodiment to a cellular system. FIG. 5 is a view depicting a configuration of a laptop PC regarding the third embodiment of the invention. FIG. 7 illustrates the frequency range of an antenna to be used for the cellular system.

As shown in FIG. 5, the sub antenna 21-1 for the cellular system is disposed at the upper end part 10-2 of the display housing 10 with the LCD 10-2, and the main antenna 21-2 for the cellular system is disposed at the right end part 10-3 of the display housing 10. The power feeding cable 10-7 is connected between the main antenna 21-2 and the radio communication module 12-1 through the hinge unit 11, and also the power feeding cable 10-6 is connected between the sub antenna 21-1 and the radio communication module 12-1 through the hinge unit 11.

For instance, the main antenna 21-2 in the cellular system is a transmission/reception antenna, and the sub antennas 21-1 is a reception antenna. Here, it is supposed that the antennas 21-2 and 21-2 for the cellular system are ones to be mounted on a cellular phone.

This arrangement makes the length of the power feeding cable 10-7 connecting the main antenna 21-2 to the radio communication module 12-1 shorter than that of the power feeding cable 10-6 connecting the sub antenna 21-1 to the radio communication module 12-1, so that the cable loss further decreases. Thereby, the third embodiment may decrease the cable loss with respect to the main antenna 21-2 to improve the communication performance of antennas.

In the first to the third embodiments, if the radio communication module is not disposed at an almost center part of the main body housing 12 of the PC, it is needed to change the position to dispose the main antenna 21-2 to the right end part 10-3 and the left end part 10, in accordance with the position of the radio communication module concerned. For example, when the radio communication module is positioned at the left side of the main housing 12, the arrangement of the main antenna 21-2 at the left end part 10-4 makes the cable length between the main antenna 21-2 and the radio communication module shorter.

Fourth Embodiment

In the aforementioned first to third embodiments, the arrangements of the antennas which make the cable lengths short, are described. In the fourth embodiment, optimum positions of the antennas are presented by taking account of the width of the display housing to which cables are disposed.

FIG. 8 is a view for explaining a configuration of the fourth embodiment of the invention. As shown in FIG. 8, in general, the upper end part 10-2 of the display housing 10 frequently becomes narrow in housing wide in comparison to other end parts. Therefore, intending to dispose an antenna at the upper end part 10-2 requires a connection to the radio communication module by using a thin cable, and it results in an increase in cable loss.

In the fourth embodiment, therefore, the main antenna for the cellular system is disposed the right and left side parts (left end part 10-4 in FIG. 8) of the display housing 10 with a relatively wide, and the sub antenna for the cellular system is disposed at the upper end part 10-2 with a relatively narrow housing wide. Because the implementation makes it possible to connect the main antenna to the radio communication module with a thick and low loss cable, the laptop PC may further decrease the cable loss with respect to the main antenna 21-2 and enhance the communication performance of antennas.

Fifth Embodiment

Figure 9:
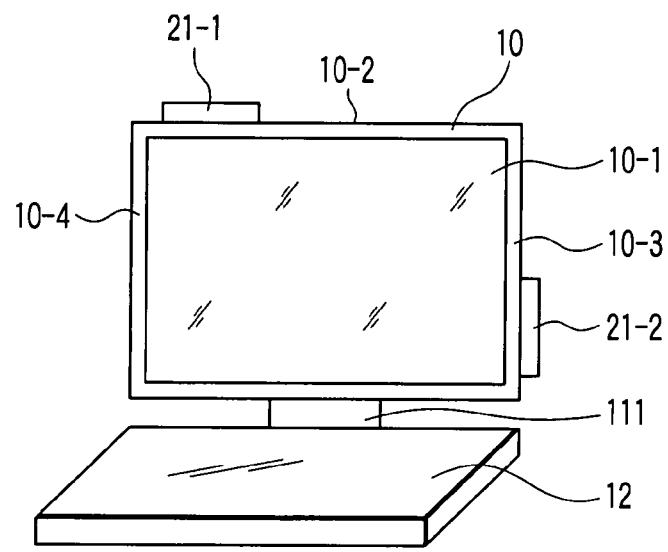
FIG. 9 is an exemplary view illustrating a configuration of a laptop PC regarding the fifth embodiment of the invention.

The fifth embodiment takes a use state of a user in the case of application of the invention to a tablet PC, and takes an optimum arrangement of antennas. FIG. 9 depicts a configuration of a laptop PC regarding the fifth embodiment of the invention. As shown in FIG. 9, in the tablet PC, a connecting unit between the display housing 10 and the main body housing 12 becomes a turning hinge 111. The sub antenna 21-1 for the cellular system is disposed at the upper end part 10-2 of the display housing 10 with the LCD 10-1, and the main antenna 20-2 for the cellular system is disposed at the right end part 10-3 of the display housing 10.

Figure 10:
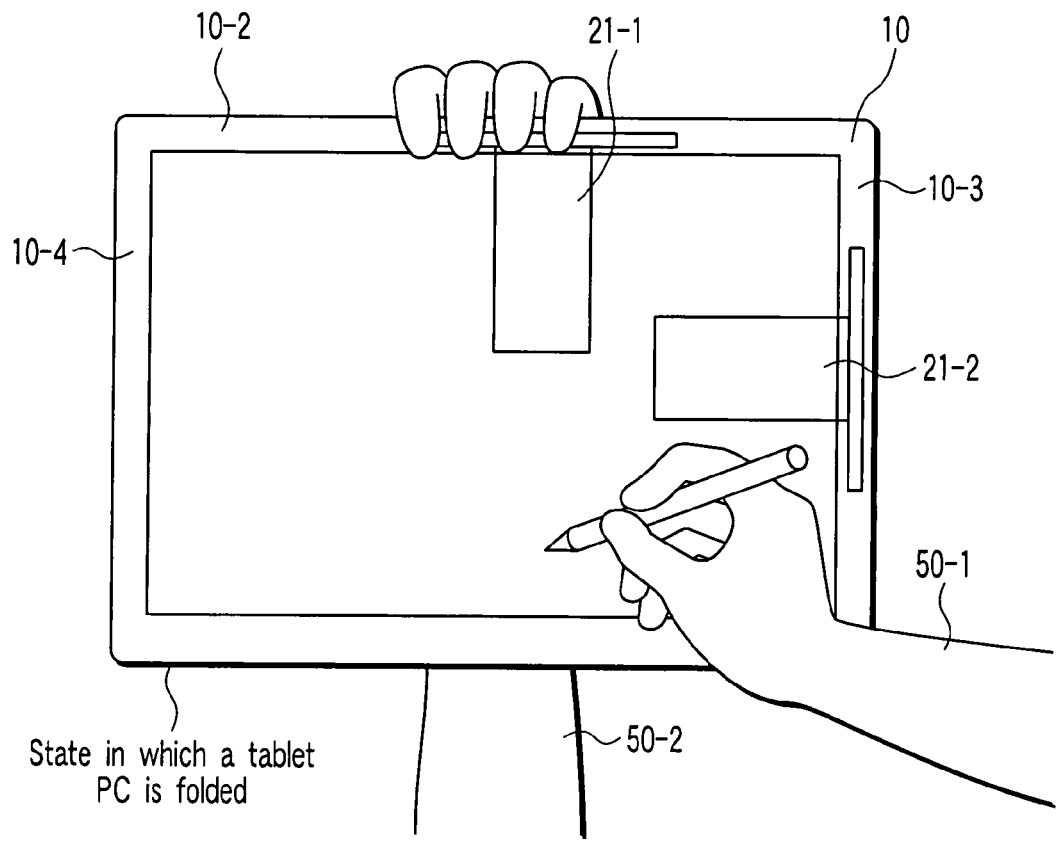
FIG. 10 is an exemplary view for explaining an operation of the fifth embodiment.

Hereinafter, operations of the fifth embodiment will be described by referring to FIG. 10. Folding the laptop PC poses, as shown in FIG. 2, a state in which the display housing 10 and the main body housing 12 is adjacent to each other. FIG. 10 illustrates the state in which the user performs a pen input with the right hand 50-1 while holding the tablet PC folded with the left hand. The left hand 50-2 covering the sub antenna 21-1 disposed at the upper end part 10-2 results in a possible risk to deteriorate of an antenna performance; however, the left hand 50-2 does not cover the main antenna 21-2 disposed as the right end part 10-3. Accordingly, the table PC being capable of making a communication in use of this main antenna 21-2, it may maintain the performance of the cellular system.

Figure 11:
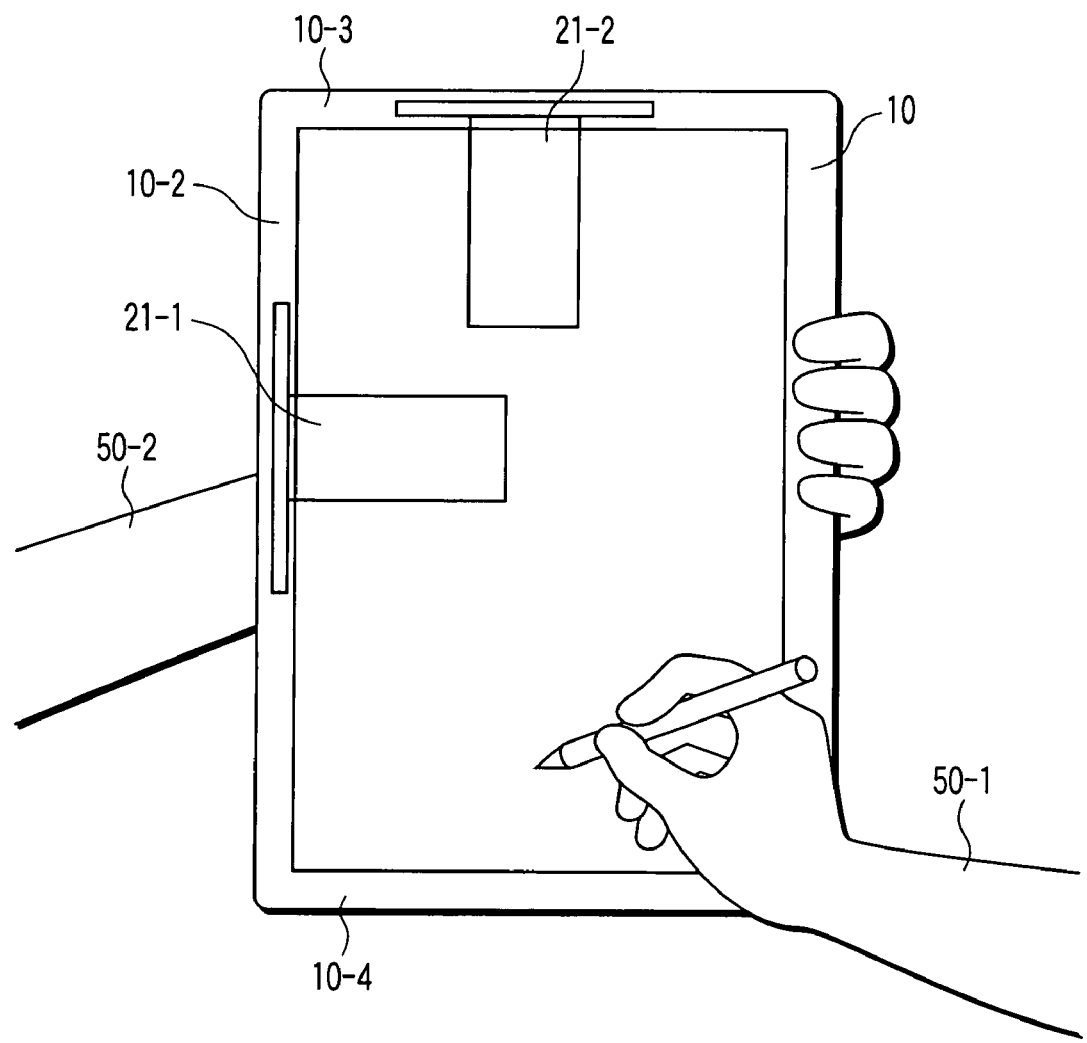
FIG. 11 is an exemplary view for explaining another operation of the fifth embodiment.

FIG. 11 is a view for explaining another operation of the fifth embodiment. FIG. 11 shows a state in which the user carries out a pen input with the right hand 50-1 while holding the folded tablet PC with the left hand 50-2 in a vertical direction. In such a case, deterioration of an antenna performance is a possible risk because the left hand 50-2 is adjacent to the sub antenna 21-1 disposed at the upper end part 10-2; however, any hand does not cover the main antenna 21-2 and is not adjacent to the antenna 21-2. Therefore, the tablet PC is capable of transmitting/receiving by using the main antenna 21-2, and it may maintain the communication performance of the cellular system.

According to the fifth embodiment, using a pair of radio antennas enables improving communication performance.

For example, the main antenna forming at the end part of the display housing almost orthogonal to the radio communication module, and forming the sub antenna at the end part of the display housing to be in almost parallel with the connecting unit, the cable length for the main antenna becomes shorter to decrease a cable loss. Therefore, the communication performance of the antennas is improved.

In the case that the main antenna and the sub antenna are used in the cellular system, the communication performance of the cellular system is enhanced.

Forming the main antenna at the end part of the display housing almost orthogonal to the radio communication module, and forming the sub antenna at the end part of the display housing to be in almost parallel with the connecting unit, eliminates the case in which the main antenna is covered with the hand of the user, or the hand of the user becomes close to the main antenna in using, for example, the tablet PC. Thus the communication performance of the antennas may be improved.

While certain embodiment of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A personal computer, comprising:
   a main body housing;
   a display unit of a rectangular shape including a pair of first end parts substantially parallel to each other, and a pair of second end parts substantially parallel to each other and substantially perpendicular to the first end parts;
   a connecting unit which rotatably connects one of the second end parts of the display housing to the main body housing;
   a first radio antenna provided at one of the first end parts of the display unit;
   a second radio antenna provided at one of the second end parts of the display unit; and
   a radio communication module, disposed in the main body housing, configured to transmit radio signals from only the first antenna and to receive radio signals from the first antenna and second antenna.

2. The personal computer according to claim 1, wherein the first end parts are shorter than the second end parts.

3. The personal computer of claim 2, further comprising:
   a first cable configured to connect the first radio communication antenna to the radio communication module through the connecting unit; and
   a second cable configured to connect the second radio communication antenna to the radio communication module through the connecting unit,
   the first radio communication antenna provided at a right or left one of the first end parts, and the second radio communication antenna provided at an upper one of the first end parts.

4. The personal computer of claim 3, wherein:
   the connecting unit is comprises a turning hinge; and
   in a tablet state in which the display unit is rotated through 180° by the turning hinge and is superposed on the main body housing, when the personal computer is used in a first mode, the first radio communication antenna is positioned at a right end or a left end of the display unit, and when the personal computer is used in a second mode, the first radio communication antenna is positioned at an upper end or a lower end of the display unit.

5. The personal computer of claim 2, wherein:
   the connecting unit comprises a turning hinge; and
   in a tablet state in which the display unit is rotated through 180° by the turning hinge and is superposed on the main body housing, when the personal computer is used in a first mode, the first radio communication antenna is positioned at a right end or a left end of the display unit, and when the personal computer is used in a second mode, the first radio communication antenna is positioned at an upper end or a lower end of the display unit.

* * * * *